United States Patent
Drerup et al.

(10) Patent No.: US 7,490,201 B2
(45) Date of Patent: *Feb. 10, 2009

(54) METHOD AND BUS PREFETCHING MECHANISM FOR IMPLEMENTING ENHANCED BUFFER CONTROL

(75) Inventors: Bernard Charles Drerup, Austin, TX (US); Richard Nicholas, Pflugerville, TX (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/944,644

(22) Filed: Nov. 26, 2007

(65) Prior Publication Data

US 2008/0071954 A1    Mar. 20, 2008

Related U.S. Application Data

(63) Continuation of application No. 11/050,295, filed on Feb. 3, 2005, now Pat. No. 7,328,312.

(51) Int. Cl.
*G06F 13/28* (2006.01)
*G06F 12/00* (2006.01)

(52) U.S. Cl. .................. 711/137; 711/100; 711/154; 710/56

(58) Field of Classification Search ............... 711/100, 711/137, 154; 710/56
See application file for complete search history.

(56) References Cited

U.S. PATENT DOCUMENTS

| | | | |
|---|---|---|---|
| 4,189,768 A | * 2/1980 | Liptay et al. | 712/204 |
| 5,537,574 A | * 7/1996 | Elko et al. | 711/141 |
| 6,047,363 A | * 4/2000 | Lewchuk | 711/213 |
| 6,067,613 A | * 5/2000 | Balmer | 712/32 |
| 6,075,929 A | 6/2000 | MacLaren | |
| 6,195,735 B1 | 2/2001 | Krueger et al. | |
| 6,393,527 B1 | 5/2002 | Rao et al. | |
| 6,636,927 B1 | 10/2003 | Peters et al. | |
| 6,871,246 B2 | 3/2005 | Moyer | |
| 7,139,878 B2 | 11/2006 | Malik et al. | |

* cited by examiner

*Primary Examiner*—Tuan V. Thai
(74) *Attorney, Agent, or Firm*—Joan Pennington

(57) ABSTRACT

A method, and bus prefetching mechanism are provided for implementing enhanced buffer control. A computer system includes a plurality of masters and at least one slave exchanging data over a system bus and the slave prefetches read data under control of a master. The master generates a continue bus signal that indicates a new or a continued request. The master generates a prefetch bus signal that indicates an amount to prefetch including no prefetching. The master includes a mechanism for continuing a sequence of reads allowing prefetching until a request is made indicating a prefetch amount of zero.

7 Claims, 7 Drawing Sheets

METHOD AND BUS PREFETCHING MECHANISM FOR IMPLEMENTING ENHANCED BUFFER CONTROL

This application is a continuation application of Ser. No. 11/050,295 filed on Feb. 3, 2005 now U.S. Pat. No. 7,328,312.

FIELD OF THE INVENTION

The present invention relates generally to the data processing field, and more particularly, relates to a method, and a bus prefetching mechanism for implementing enhanced buffer control.

DESCRIPTION OF THE RELATED ART

Computer systems have a system bus and a multitude of master and slave devices that transfer data among each other over the system bus. Masters initiate requests to slaves that respond to the requests. The system bus allows multiple masters to take turns accessing a given slave. The system bus includes an arbiter for this purpose. The bus arbiter selects among the requests destined for a given slave and selects one at a time, or however many the slave can handle, to be directed to that slave.

Typically, the master specifies a precise amount of data it needs when making a read request to a slave. Consequently, the slave returns the needed amount of data. Masters sometime behave in a manner that allows them to predict the need for data beyond the precise amount they are currently requesting. This is particularly common among masters that process data in a predominately sequential manner. Such masters have a high likelihood that the next data they will need is simply the data immediately following the data they are currently reading.

In systems where the slave requires a relatively long amount of time to acquire data in response to a read request and the master is able to predict the likely need for additional data, it is performance beneficial for data to be prefetched. Prefetching is the process of acquiring more than the precisely specified amount of data and storing the additional data in a temporary buffer, so that if the master does in fact subsequently need the additional data, in can be quickly delivered from the temporary buffer. This inevitably results in the discarding of some of the data that is acquired, when the master subsequently determines that it does not need some or all of the prefetched data.

Prefetching can be supported entirely by the master, without the knowledge of the slave. In this case, the master asks the slave for more read data than the master is sure it needs, and the slave delivers the precise amount it is asked for. The master internally buffers the prefetched data, and internally delivers the data if it subsequently needs it. The master also discards the prefetched data if it subsequently determines it does not need it. This mechanism is sometimes used across the PCI-X and PCI Express buses, where a master can ask for as much as 4 k bytes of data, a large amount relative to typical transaction sizes of 4 to 256 bytes.

Prefetched data can also be stored in the slave. This allows temporary buffers for holding prefetch data to be shared by multiple masters. This sharing reduces the total buffer space needed for the system, reducing system costs. When the slave holds prefetched data, the system bus includes a mechanism for the master to indicate to the slave the need to prefetch and sometimes the amount to prefetch. Because a master is not guaranteed to need prefetched data, the slave must include a buffer management mechanism that determines when to discard prefetched data.

In current systems, the buffer management mechanism of selecting a buffer area to discard when a new request is made but no space buffer space is available, generally is either complex or inefficient. Simple mechanisms, such as always selecting a specific buffer area or round-robin selection, result in frequently discarding data that would have been used, this is called thrashing. More efficient algorithms, such as selecting the least-recently-used (LRU) buffer area, are complex and still occasionally allow thrashing.

In current systems, the slave also uses an address comparison to determine when to deliver prefetched data from the temporary buffer, with a prefetch data hit. Address comparisons require a significant amount of logic resources and consume a significant portion of the timing budget.

SUMMARY OF THE INVENTION

Principal aspects of the present invention are to provide a method, and bus prefetching mechanism for implementing enhanced buffer control. Other important aspects of the present invention are to provide such method, and bus prefetching mechanism substantially without negative effect and that overcome many of the disadvantages of prior art arrangements.

In brief, a method, and bus prefetching mechanism are provided for implementing enhanced buffer control. A computer system includes a plurality of masters and at least one slave exchanging data over a system bus and the slave prefetches read data under control of a master. The system bus includes a set of signals controlled by the master, monitored by the slave, and propagated by the system bus with each transaction. A master generates a continue bus signal indicating a new or a continued request. The master generates a prefetch bus signal indicates an amount to prefetch including no prefetching. The master continues a sequence of reads allowing prefetching until a request is made indicating a prefetch amount of zero.

In accordance with features of the invention, the slave includes prefetch control logic for discarding prefetch data when a request indicating a prefetch amount of zero arrives. The prefetch control logic of the slave captures a tag identifying the master on a new request and then compares the tag on continuation requests for determining a prefetch buffer hit.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiment, a mechanism used between a master and a slave, over the system bus that connects them, allows the slave to manage prefetch data buffers in a simple and efficient manner. Using this mechanism of the preferred embodiment, the master can use a small number of system bus signals to indicate to the slave when to prefetch, how much to prefetch, when to extend prefetch, and when to discard prefetched data. The invention also includes an efficient mechanism for the slave to determine a prefetch data hit.

In accordance with features of the preferred embodiment, the system bus includes a new set of signals controlled by the master, monitored by the slave, and propagated by the system bus with each transaction. The new system bus signals may be provided as predefined fields in the header of a packet. One of the signals is called CONTINUE, and indicates when a request is new or a likely prefetch data hit. A new request is never a prefetch data hit. A likely prefetch data hit is a request that needs the next sequential block of data following a block of data that was fetched during a previous request and that previous request indicated the need for prefetching. The other system bus signals are bus signals called PREFETCH( ), which indicate if, and how much, additional prefetch data is needed beyond the currently requested amount.

In accordance with features of the preferred embodiment, the masters also use the CONTINUE and PREFETCH signals to indicate when prefetched data should be discarded. The slave recognizes this indication and discards the associated prefetch data. This is the only discard function that a prefetching slave must implement.

Figure 1:
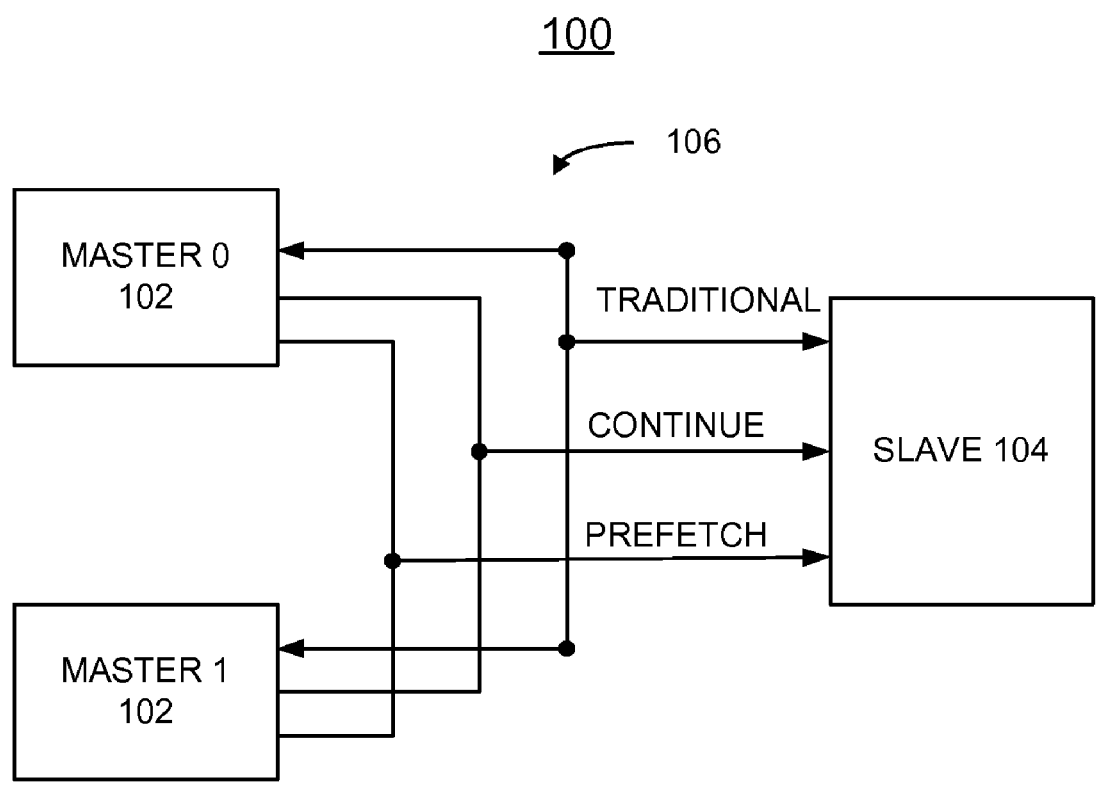
FIG. 1 is a block diagram illustrating a computer system having a bus prefetching mechanism for implementing enhanced buffer control in accordance with the preferred embodiment.

Having reference now to the drawings, in FIG. 1, there is shown a computer system of the preferred embodiment generally designated by the reference character 100. As shown in FIG. 1, computer system 100 includes a plurality of masters 102 and a slave 104 connected via an enhanced system bus 106 in accordance with the preferred embodiment. Enhanced system bus 106 is made up of a traditional system signals plus the CONTINUE and PREFETCH signals in accordance with the preferred embodiment.

The CONTINUE bus signal is a transaction attribute, for example, transferred with the address bus, that indicates that a request is the continuation of a previous request, and is therefore allowed to hit prefetch data. When this signal is deasserted, it indicates that this read transaction requires the slave to acquire new data and the slave is not allowed to forward previously fetched data.

The PREFETCH( ) bus signal is a transaction attribute that indicates how many 256-byte blocks, or other predefined size, of additional, sequential read data the master is likely to read. The number of bits in PREFETCH( ) is system specific. For example, when PREFETCH=1, the requested data is needed, plus the master will return for additional continuation data starting at the next address (the ending address of the current request plus one), with a size from 1 to 256 bytes (or other maximum size). When PREFETCH=2, the requested data is needed plus 257 to 512 bytes, and the like. With PREFETCH=0 which is defined as a default for masters that do not request prefetching, only the requested data is indicated.

In accordance with features of the preferred embodiment, slaves 104 need only pay attention to the CONTINUE and PREFETCH signals if the slaves are high enough in latency to benefit from prefetching. For example, DRAM and SRAM controllers and Status/Control register slaves have no use for this function and can ignore these signals; however, slave devices such as PCI-X, PCI Express and RapidIO controllers benefit from supporting the CONTINUE and PREFETCH signals of the preferred embodiment.

Figure 2:
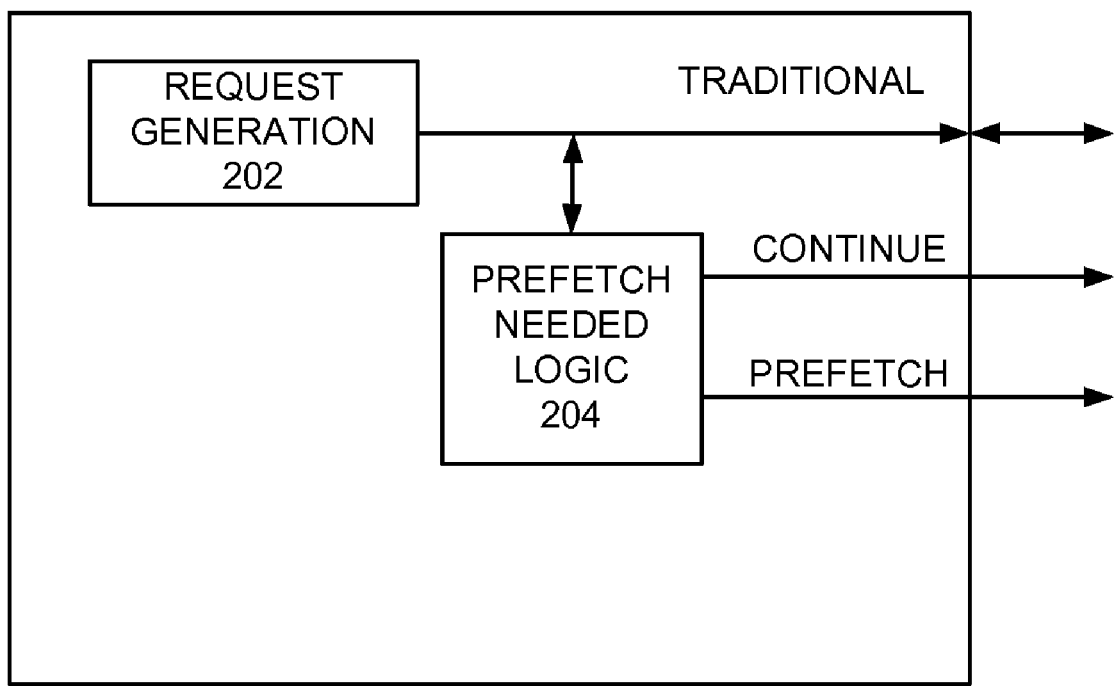
FIG. 2 is a block diagram illustrating a master of the computer system of FIG. 1 in accordance with the preferred embodiment.

Referring now to FIG. 2, there is shown more detail of a master 102, such as master 0 or master 1 of FIG. 1. Master 102 includes a request generation function 202 that is the traditional logic for generating requests. Master 102 includes new logic, a Prefetch Needed Logic 204 that controls the new CONTINUE and PREFETCH signals.

In accordance with features of the preferred embodiment, masters 102 begin a sequence of requests that instruct the slave to prefetch by first making a new request, as indicated by deasserting the CONTINUE bus signal and driving PREFETCH>0. Once a Master 102 makes a request with PREFETCH>0, it must continue making continuation requests, asserting CONTINUE, to sequential addresses until it makes a request with PREFETCH=0. The slave 104 discards any remaining prefetch data associated with a sequence after satisfying a request with PREFETCH=0.

In accordance with features of the preferred embodiment, a Continuation request can be made any time after the current New or Continuation request. There is no maximum time specified for when a Continuation request is made, but long delays unnecessarily tie up buffer space in the slave, so the master should not withhold the Continuation request indefinitely. The master is allowed to make other requests between the original and one or more Continuation requests, but they must be guaranteed to complete or be re-orderable behind continuation read requests. This ensures forward progress despite possible reads to a prefetching slave 104 that has full buffers.

Figure 3:
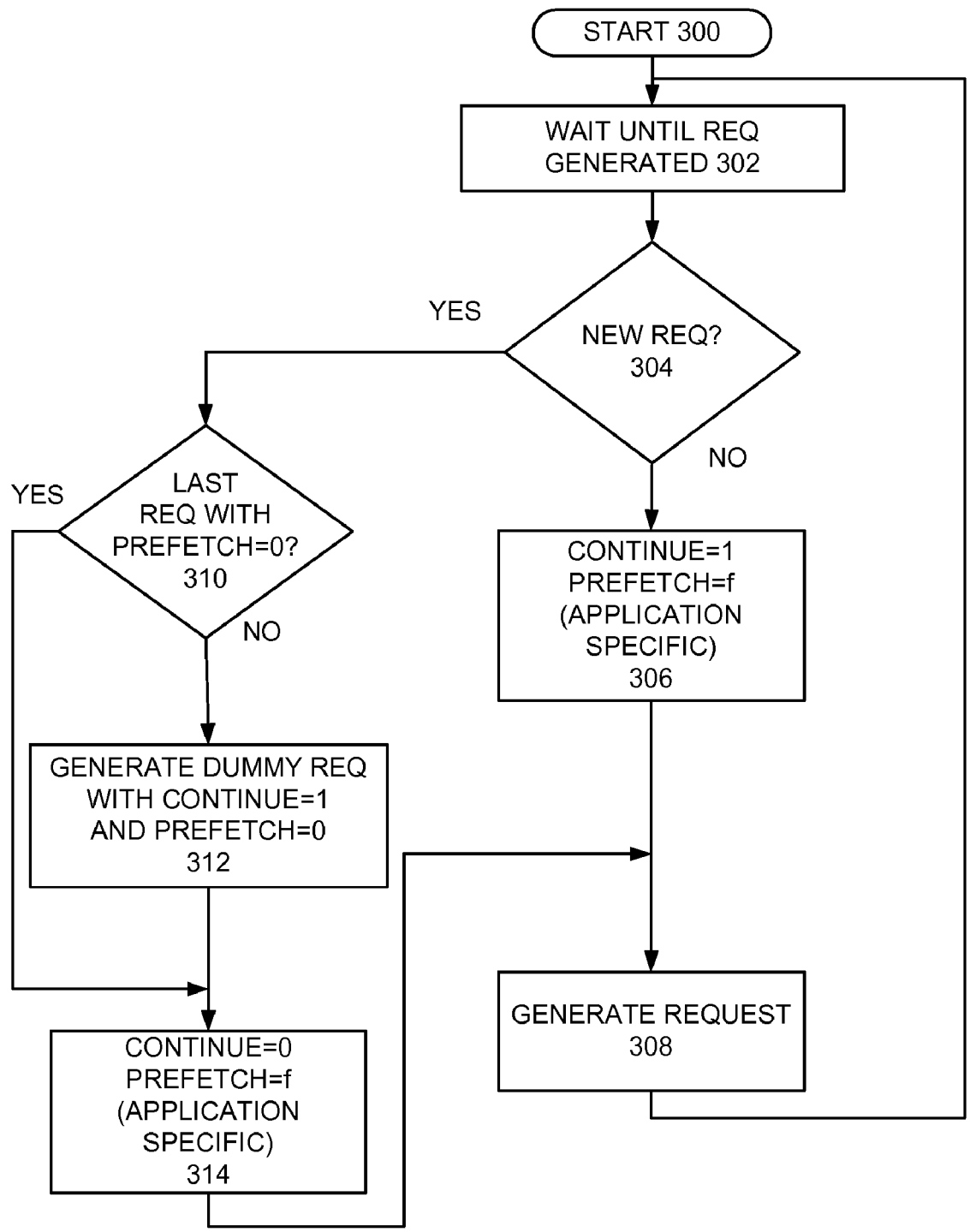
FIG. 3 is a flow chart illustrating exemplary functional steps for implementing enhanced buffer control in accordance with the preferred embodiment

Referring also to FIG. 3, there is shown a flow chart illustrating the function of the Prefetch Needed Logic 204 of master 102 starting at a block 300. Waiting for a request to be generated is performed as indicated in a block 302. Checking for a New request is performed as indicated in a decision block 304. When a New request is not identified, then the CONTINUE bus signal is asserted, and the PREFETCH( ) bus signal is driven to f, which is application specific, to indicate a number of blocks additional, sequential read data the master is likely to read, as indicated in a block 306.

A master 102 is allowed to indicate a Prefetch value>1 on a current request but then make the next Continuation request with Prefetch=0. This may cause the slave 104 to discard some of the prefetched data. This typically occurs because the master 102 asked for prefetch data that it subsequently determines is not needed, and the determination occurs after the original request is made but before all the prefetch data is transferred to the master.

While a master 102 that makes an original request with Prefetch=N typically makes the next request with Prefetch=N−1, it is legal for the master to make the next request with Prefetch>N−1. This typically occurs when the master wants to extend the prefetching either because it has freed up internal buffer space or because it has determined that it needs more sequential data than previously known.

A master 102 should only indicate prefetch values greater than zero when it is certain, or at least highly likely, that it needs the continuation data. For example, this typically occurs in a DMA controller when it is making the first request of a transfer with a total length greater than 256 bytes. Also processors typically never indicate Prefetch.

A request is generated as indicated in a block 308, then the sequential steps return to block 302 to wait for a request to be generated. When a New request is identified at decision block 304, then checking whether the last request made with PREFETCH=0 is performed as indicated in a decision block 310. When the last request made did not have PREFETCH=0, then a dummy request with CONTINUE=1 and PREFETCH=0 is generated as indicated in a block 312. Next and when the last request made had PREFETCH=0, the CONTINUE bus signal is deasserted, and the PREFETCH( ) bus signal is driven to f, which is application specific, as indicated in a block 314. Then a request is generated at block 308 and the sequential steps return to block 302 to wait for a request to be generated.

Figure 4:
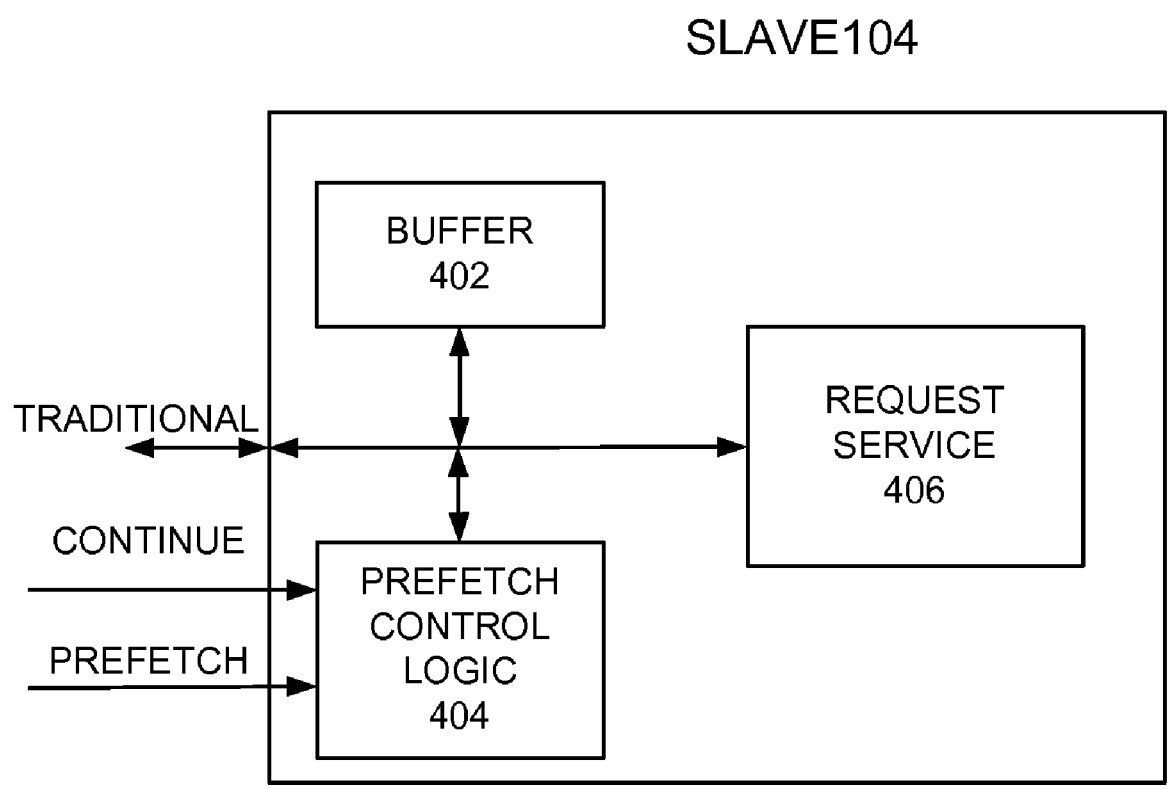
FIG. 4 is a block diagram illustrating a slave of the computer system of FIG. 1 in accordance with the preferred embodiment.

Referring now to FIG. 4, there is shown more detail of a slave 104 of FIG. 1. Slave 104 includes a buffer 402, a Prefetch Control Logic 404, and a traditional logic or a Request Service 406 that controls the data flow to a particular slave subdevice (not shown). The buffer 402 is a memory that holds prefetched data received from the Request Service 406. The Prefetch Control Logic 404 is new logic that controls Request Service 406 and the Buffer 402 based on the bus CONTINUE and PREFETCH signals.

In accordance with features of the preferred embodiment, a slave 104 is allowed to discard prefetch data at any time, but slave 104 is also allowed to hold prefetch data until a Continuation request with Prefetch=0 is made. The latter algorithm is guaranteed to make forward progress because of the master requirement to unconditionally make a Continuation request following a request with Prefetch>0. The latter algorithm also reduces buffer thrashing. It is the simplicity and efficiency of this discard algorithm that is one main benefit of this invention.

In accordance with features of the preferred embodiment, slaves 104 capture an Identification Tag identifying a master 102 on New requests. When a transaction arrives with CONTINUE asserted, the slave 104 need only compare the Tag identifying a master 102 with the captured values to determine a prefetch buffer hit, no address comparison is needed. This also prevents different masters 102 from coincidentally hitting a matching address when two masters are reading from the same address range, which could otherwise lead to data inconsistency. Note the Tag comparison may ignore some bits of the tag so that the master 102 can have multiple overlapping continuation requests pending.

Figure 5A:
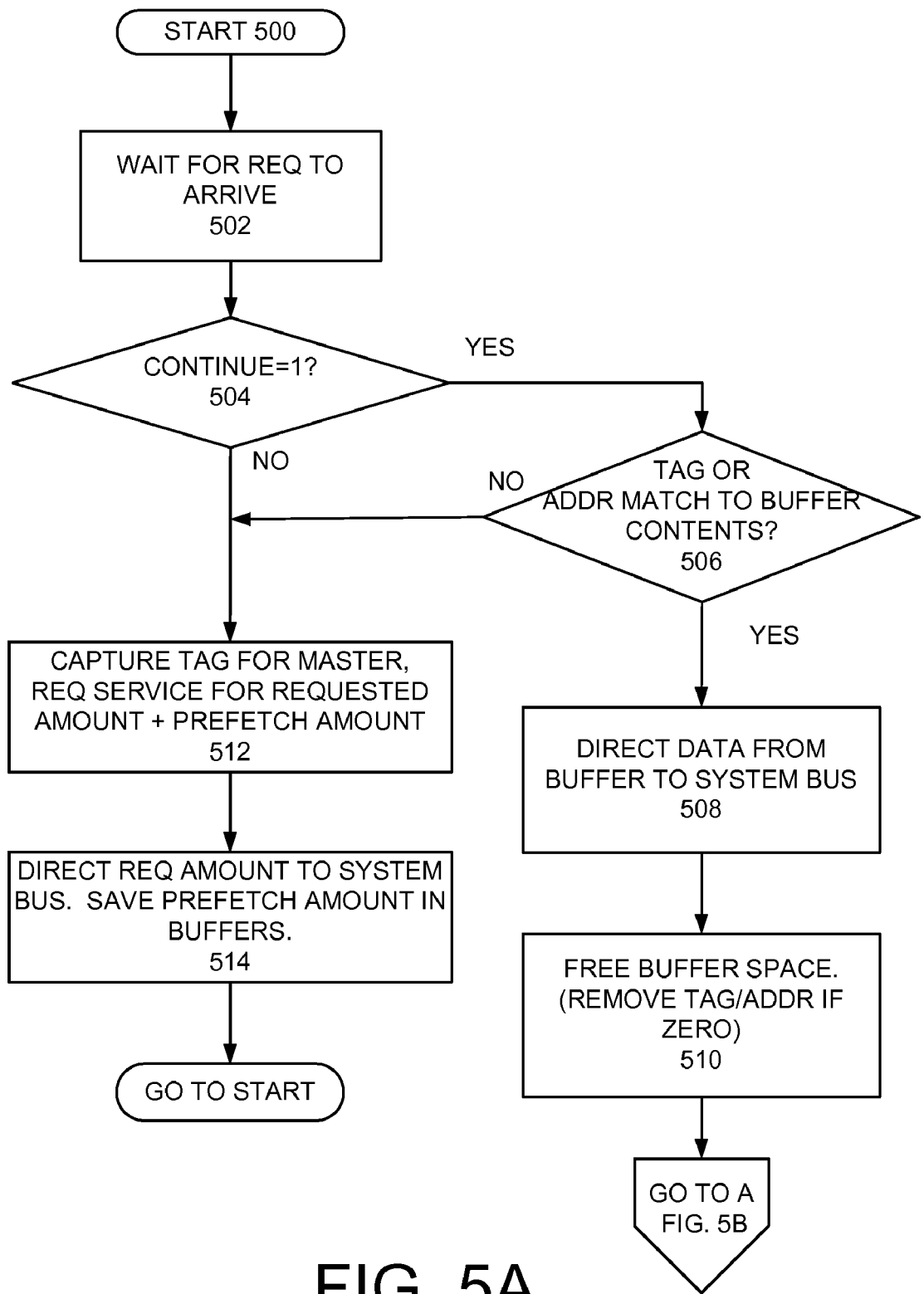
FIGS. 5A and 5B are flow charts illustrating exemplary functional steps for implementing enhanced buffer control in accordance with the preferred embodiment.
Figure 5B:
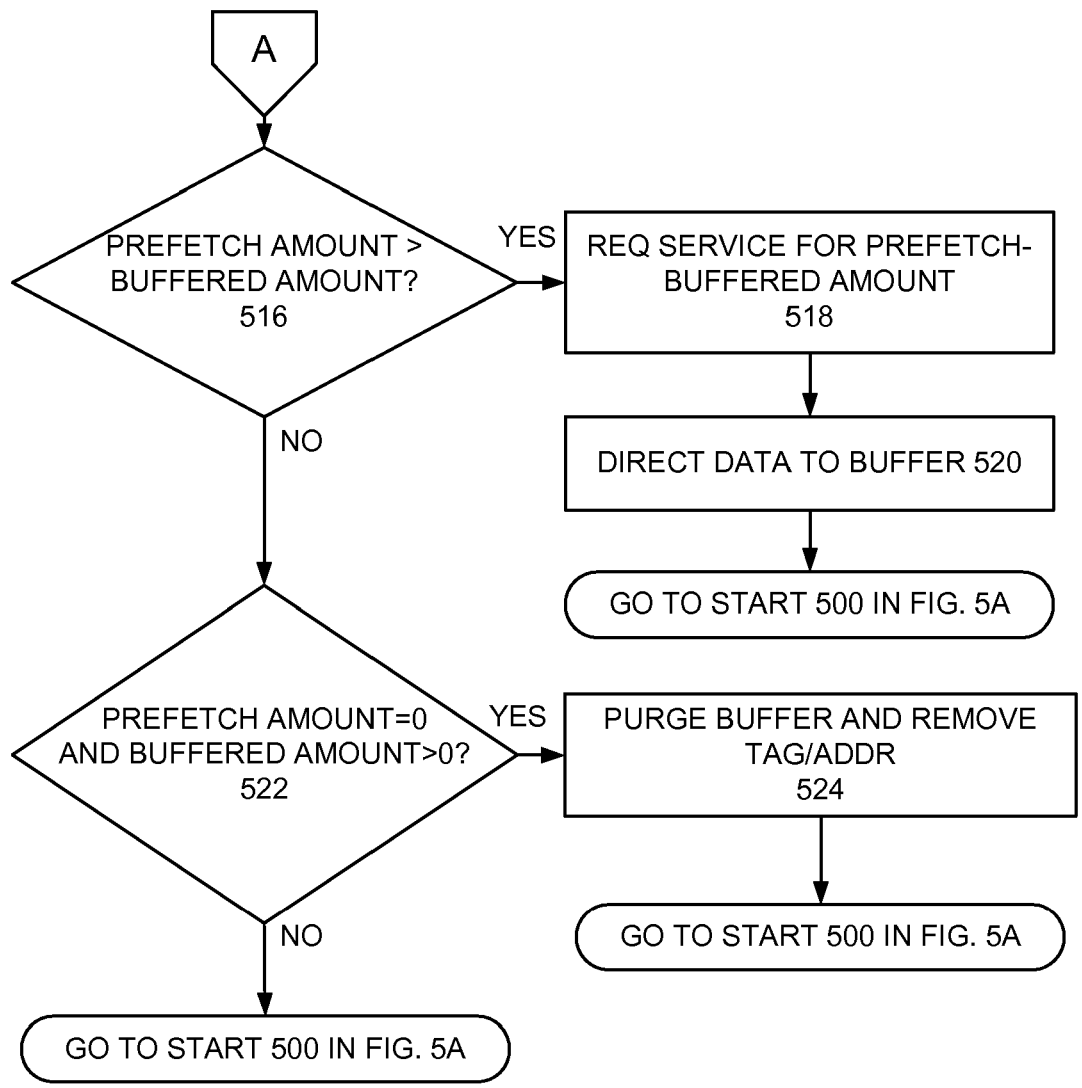

Referring now to FIGS. 5A and 5B, there is shown a flow chart illustrating the function of the Prefetch control Logic 404 of the slave 104 starting at a block 500 in FIG. 5A. Waiting for a request to arrive is performed as indicated in a block 502. Checking for an asserted CONTINUE bus signal or CONTINUE=1 is performed as indicated in a decision block 504. If the CONTINUE bus signal is asserted with CONTINUE=1, then checking for a tag or address match is performed as indicated in a decision block 506. When a tag or address match is found, then data from the buffer 402 is directed to the system bus 106 as indicated in a block 508. Then the buffer space is freed, removing tag/address as indicated in a block 510. Then the sequential operations continue following entry point A in FIG. 5B.

Otherwise, when the CONTINUE bus signal is not asserted or CONTINUE=0, then the slave captures a tag identifying the master on each new request and data is requested of Request Service 406 for the requested amount and the prefetch amount as indicated in a block 512. Then the requested amount is directed to the system bus 106 and the prefetch amount is saved in buffer 402 as indicated in a block 514. Then the sequential operations continue going to start 500 in FIG. 5A.

Referring now to FIG. 5B following entry point A, checking whether the Prefetch amount is greater than the buffered amount is performed as indicated in a decision block 516. If the Prefetch amount is greater than the buffered amount, the service for the Prefetch amount less the buffered amount is requested as indicated in a block 518. Then the data is directed to the buffer 402 as indicated in a block 520. Then the sequential operations continue going to start 500 in FIG. 5A.

Otherwise, when the Prefetch amount is not greater than the buffered amount, the checking is performed to determine whether the Prefetch amount equals zero and the buffered amount is greater than zero as indicated in a decision block 522. If the Prefetch amount is greater than the buffered amount, then the buffer is purged and the tag/address is removed as indicated in a block 524. Then the sequential operations continue going to start 500 in FIG. 5A.

Figure 6:
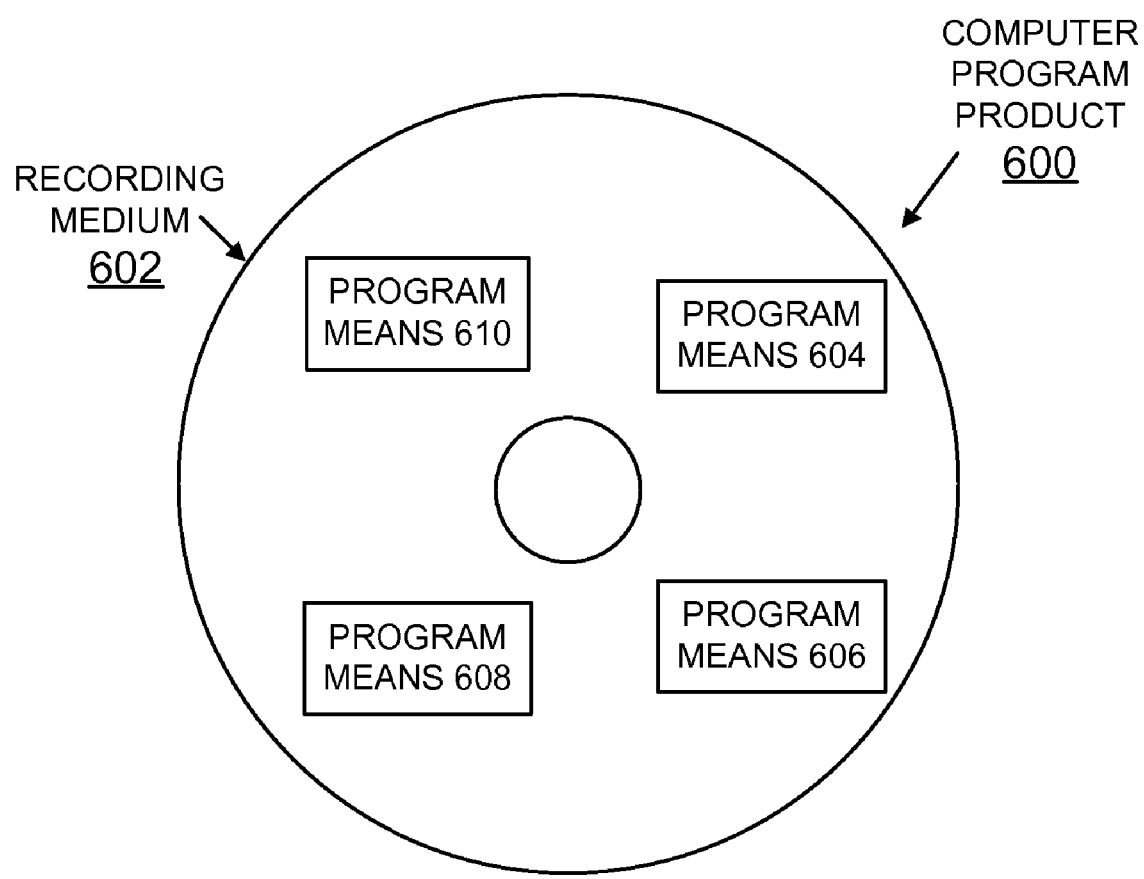
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing enhanced buffer control of the preferred embodiment in the system 100 of FIG. 1.

A sequence of program instructions or a logical assembly of one or more interrelated modules defined by the recorded program means 604, 606, 608, 610, direct the computer system 100 for implementing enhanced buffer control of the preferred embodiment.

While the present invention has been described with reference to the details of the embodiments of the invention shown in the drawing, these details are not intended to limit the scope of the invention as claimed in the appended claims.

What is claimed is:

1. A bus prefetching apparatus for implementing enhanced buffer control in a computer system comprising:
   a plurality of masters and at least one slave exchanging data over a system bus;
   the slave prefetching read data under control of a master;
   the system bus including a set of signals; said set of signals controlled by the master, monitored by the slave, and propagated by the system bus with a transaction over the system bus;
   the master generating a continue bus signal for indicating a new or a continued request;
   the master generating a prefetch bus signal for indicating an amount to prefetch:
   the master continues a sequence of reads allowing prefetching until a request is made indicating a prefetch amount of zero; and
   the slave includes prefetch control logic, discarding prefetch data when a request indicating a prefetch amount of zero arrives.

2. A bus prefetching apparatus for implementing enhanced buffer control in a computer system as recited in claim 1 wherein the slave includes prefetch control logic for capturing a tag identifying the master on a new request.

3. A bus prefetching apparatus for implementing enhanced buffer control in a computer system as recited in claim 2 wherein the prefetch control logic compares the tag on the continue request for determining a prefetch buffer hit.

4. A bus prefetching apparatus for implementing enhanced buffer control in a computer system as recited in claim 1 wherein the continue bus signal is a transaction attribute indicating that a prefetch data hit is allowed.

5. A bus prefetching apparatus for implementing enhanced buffer control in a computer system as recited in claim 1 wherein the continue bus signal is deasserted indicating that the slave is not allowed to forward stored prefetched data.

6. A bus prefetching apparatus for implementing enhanced buffer control in a computer system as recited in claim 1 wherein the prefetch bus signal is a transaction attribute indicating a predefined size for prefetching sequential read data.

7. A bus prefetching apparatus for implementing enhanced buffer control in a computer system as recited in claim 1 wherein the slave includes prefetch control logic for monitoring the continue bus signal and the prefetch bus signal.

* * * * *